United States Patent
Soirat

[19]

[11] Patent Number: 5,888,461
[45] Date of Patent: Mar. 30, 1999

[54] PROCESS FOR PURIFYING SODIUM ALUMINATE SOLUTIONS CONTAINING SODIUM OXALATE

[75] Inventor: Arnaud Soirat, Aix En Provence, France

[73] Assignee: Aluminium Pechiney, Courbevoie, France

[21] Appl. No.: 685,960

[22] Filed: Jul. 22, 1996

[30] Foreign Application Priority Data

Jul. 20, 1995 [FR] France ................................ 95 09040

[51] Int. Cl.$^6$ .................................. C01F 7/04; C01F 7/06
[52] U.S. Cl. ......................................... 423/121; 423/130
[58] Field of Search ..................... 423/130, 121

[56] References Cited

U.S. PATENT DOCUMENTS

| | | | |
|---|---|---|---|
| 3,832,442 | 8/1974 | Emerson | 423/111 |
| 4,275,043 | 6/1981 | Gnyra | 423/130 |
| 4,578,255 | 3/1986 | Roe et al. | 423/130 |
| 4,836,990 | 6/1989 | Swinkels et al. | 423/130 |
| 5,093,092 | 3/1992 | Misra et al. | 423/130 |
| 5,385,586 | 1/1995 | Farquharson et al. | 423/130 |
| 5,728,180 | 3/1998 | Williams et al. | 423/130 |

FOREIGN PATENT DOCUMENTS

| | | |
|---|---|---|
| 0 013 407 | 7/1980 | European Pat. Off. . |
| 0 092 028 | 10/1983 | European Pat. Off. . |
| 0 555 163 | 8/1993 | European Pat. Off. . |
| 207884 | 3/1968 | U.S.S.R. ................................ 423/130 |

OTHER PUBLICATIONS

Chemical Abstracts, vol. 69, No. 2, 1968, p. 398, AN 4054t, L.G. Romanov, et al., "Purifying Aluminate Solutions".
Process Chemistry and Physics Division Alcoa Laboratories, pp. 275–293, S.C. Libby, "The Effects of Lime/Limestone Characteristics on Causticization", (no date available).

*Primary Examiner*—Wayne Langel
*Attorney, Agent, or Firm*—Oblon, Spivak, McClelland, Maier & Neustadt, P.C.

[57] ABSTRACT

Process of sodium oxalate purification of sodium aluminate solutions resulting from alkaline attack of bauxites according to the Bayer process, comprising:
  precipitation of said sodium oxalate in at least a fraction of the pre-decomposed sodium aluminate solution, by means of an agent that destabilizes the supersaturation state of the sodium oxalate, or deoxalation initiator,
  separation of the oxalate, precipitated with the destabilizing agent in the form of an insoluble residue, and the purified sodium aluminate solution which is then recycled as the leaching liquor, characterized in that the destabilizing agent or deoxalation initiator, placed in contact with the sodium aluminate solution, is a salt other than an oxalate, a metal oxide, a metal hydroxide, or a mixture thereof, said destabilizing agent remaining insoluble and chemically inert with respect to the reaction medium, and in that, after regeneration if any, it is recycled to the top of the process as the deoxalation initiator.

27 Claims, 3 Drawing Sheets

PROCESS FOR PURIFYING SODIUM ALUMINATE SOLUTIONS CONTAINING SODIUM OXALATE

TECHNICAL FIELD

The invention relates to a process for purifying sodium aluminate solutions resulting from alkaline attack of bauxites according to the Bayer process and containing sodium oxalate.

STATE OF THE ART

The Bayer process, widely described in the specialized literature, is the essential technique for production of alumina intended for conversion into aluminum by dry electrolysis. According to the process, the bauxite ore is hot-treated with an aqueous sodium hydroxide solution at an appropriate concentration, thus dissolving the alumina to make a supersaturated sodium aluminate solution. After separation of the solid phase which is the unattacked ore residue (red muds); the supersaturated sodium aluminate solution, also called Bayer liquor, is decomposed by seeding with aluminum trihydroxide particles to cause the aluminum in solution to precipitate in the form of aluminum trihydroxide. The alumina-impoverished sodium aluminate solution is then recycled to the attack step after being concentrated and recharged with sodium hydroxide, or caustic soda, to re-establish the appropriate concentration for attacking the ore.

At the same time as the bauxite alumina is dissolved to the sodium aluminate state, the supersaturated sodium aluminate solution after the attack becomes progressively loaded with organic compounds produced by the breakdown, to varying degrees of completion, of organic matter in the ore. These organic compounds, broken down into organic sodium salts, principally in the form of sodium oxalate, are extremely troublesome. Not only do they color the sodium aluminate and aluminum trihydrate solutions, but, as they build up, the oxalates rapidly reach their critical concentration threshold and precipitate into fine needles onto the aluminum hydroxide initiator. These fine sodium oxalate needles then actually act as seeds for aluminum hydroxide precipitation, triggering an increase in the number of fine particles which become too numerous to be effectively controlled during the decomposition of sodium aluminate.

Thus, sodium oxalate precipitation affects the quality of the precipitated aluminum trihydroxide, leading in particular to wide variations in the grain size of the alumina produced and to embrittlement of the grains, which are major and even prohibitive drawbacks for the use of this alumina in production of aluminum by electrolysis.

Thus, in industrial alumina production operations, it proves necessary to control or, better still, avoid contamination of the aluminum trihydroxide initiator during the breakdown step by precipitated sodium oxalate.

Numerous processes have been proposed to limit the presence of sodium oxalate in solution in Bayer liquors.

Thus, processes have been tested that aim to destroy or break down the humic matter in the ore directly by calcination, for example, but they are not widely used industrially due to their prohibitive cost.

There are better-known processes that consist of acting on the supersaturated-liquor breakdown products by washing the aluminum trihydroxide intended for production, or washing part of the recycled aluminum hydroxide as an initiator for the breakdown step. Thus, the diluted sodium oxalate in the washings is eliminated selectively by precipitation with lime and formation of calcium oxalate. However, such processes do not lead to the aluminum trihydroxide precipitation step in a very efficient manner. Moreover, over-contamination by deposition of oxalate on the aluminum trihydroxide grains may cause embrittlement of these grains in the calcination step, resulting from thermal decomposition of oxalate trapped in the crystal structure.

To avoid these drawbacks, several processes recommend limiting the sodium oxalate concentration during decomposition of the sodium aluminate liquor to a value less than its critical precipitation concentration, without prohibitively reducing the level of dissolved organic matter, particularly humic matter, now well known to have a stabilizing effect on the liquor because this effect allows the critical concentration threshold of dissolved sodium oxalate to be regulated. With this in mind, at least a fraction of the sodium aluminate liquor resulting from decomposition, but already supersaturated with sodium oxalate, is subjected to destabilization of the concentration to precipitate and specifically separate the sodium oxalate from the then-desaturated liquor.

Thus, the process described in U.S. Pat. No. 3,899,571 (EP-A-0013407) consists of treating a Bayer liquor supersaturated with respect to the equilibrium solubility of sodium oxalate (such as the sodium-aluminate-impoverished liquors resulting from decomposition, whether or not they have been reconcentrated) by introducing a recycled sodium oxalate initiator to trigger precipitation of the dissolved sodium oxalate and arrive at the solubility equilibrium concentration of the sodium oxalate. After solid-liquid separation facilitated by using a filtration adjuvant, the purified liquor is then reintroduced into the Bayer cycle while a fraction of the sodium oxalate solid phase is used for preparation of an initiator crystal suspension, the other fraction being eliminated from the cycle.

Although this starting process proves effective in triggering precipitation of sodium oxalate, it exhibits drawbacks when applied industrially. In fact, the sodium oxalate crystals constituting the initiator rapidly become inactive because they are poisoned at the surface by the organic matter present and then have to be washed—a very delicate operation. If washing proves inadequate, the initiator activity declines, reducing the efficiency of sodium oxalate precipitation. If washing is overdone, the initiator dissolves partially and becomes granulometrically refined, leading to great difficulty in liquid-solid separations, hence to declines in purification yield.

Instead of destabilizing the Bayer liquor, supersaturated with sodium oxalate by a sodium oxalate initiator, U.S. Pat. No. 4,597,952 (EP-A-0173630) recommends the use of calcium oxalate or barium oxalate initiators whose mode of action leads indirectly to the same result. This is because calcium oxalate and barium oxalate, which are unstable in highly alkaline Bayer liquor, release the oxalate ion to form sodium oxalate which contributes to increasing the concentration of sodium oxalate in solution above the critical concentration threshold, thus causing the sodium oxalate to precipitate. The dissolved oxalate level is thus brought to the oxalate solubility limit under experimental conditions, particularly as a function of temperature and the caustic soda concentration of the liquor. In this process, it is not possible to avoid formation of sodium oxalate precipitates that are finely dispersed in the Bayer liquor and hence difficult to separate by decanting and/or filtration without the aid of adjuvants. What is more, the initiator needs to be recycled and some of the precipitated sodium oxalate must thus be recycled to regenerate the calcium oxalate or barium oxalate initiator after elimination of entrained organic matter.

To overcome the dual problem of separating fine sodium oxalate precipitates in the sodium aluminate liquor and recycling the oxalate initiators, which are fairly difficult to regenerate, the applicant has developed a process (FR-A-2686872=EP-A-0555163) consisting of triggering destabilization of sodium oxalate in the sodium aluminate, not from an oxalate-based initiator, but from an initiator based on lime which is finely divided and hence heterogeneous in nature, in the oxalate medium.

This novel initiator, which is inexpensive, with equal efficiency allows the sodium oxalate to be precipitated in the form of a cake easily separable by filtration without the addition of a filtration adjutant. Also, once it has been polluted by sodium oxalate and the precipitated organic salts, the low-cost initiator can be directly eliminated and discarded instead of being regenerated and recycled.

While this process has proved particularly suitable for treating relatively low volumes of liquor charged with sodium oxalate, it has drawbacks in high-capacity facilities processing trihydrate bauxites or mixed bauxites rich in organic matter, particularly of African or Indian origin. In this case, the broken-down organic matter, particularly in the form of sodium oxalate, requires frequent deoxalation operations that indirectly increase the aluminum hydroxide production costs, for two essential reasons:

The increase in consumption of the lime initiator is such that its cost can no longer be neglected, particularly as, to improve the oxalate precipitation kinetics with a view to cutting residence times, the quantity of initiator must be increased.

Even with the recommended temperature and concentration of free soda and dissolved alumina in the Bayer liquor, a small quantity of dissolved alumina combines with the lime to form an insoluble tricalcium aluminate which is retained upon solid-liquid separation, then eliminated with the oxalate precipitate and the initiator, bringing about further loss of alumina.

PROBLEM AT ISSUE

A process of sodium oxalate elimination from Bayer liquors remains to be found that has both the good selectivity of the processes employing an oxalate-based destabilizing agent according to U.S. Pat. No. 3,899,571 or U.S. Pat. No. 4,597,952 and the simplicity, particularly in terms of filterability, of the processes employing a lime-based initiator as a destabilizing agent. This should occur without the respective drawbacks, namely difficulty in regenerating the initiators with a view to recycling for the former processes and raw materials losses with the unrecycled initiator and alumina combined in the case of the latter processes.

SUBJECT OF INVENTION

The process developed by the applicant meets these conditions and is based on the finding that effective use can be made, as an agent destabilizing the supersaturation state of sodium oxalate, of heterogeneous initiators which, unlike lime, are virtually inert chemically with respect to the reaction medium and recyclable with no noteworthy alteration in their activity which is periodically monitored; these heterogeneous initiators are also at least partially regenerable merely by washing or calcination.

More specifically, the invention relates to a process for purifying sodium aluminate solutions resulting from alkaline attack of bauxites according to the Bayer process and containing sodium oxalate, said process comprising:

precipitation of the dissolved sodium oxalate in at least a fraction of the sodium aluminate solution which has been previously broken down, possibly concentrated before recycling as the leaching liquor, by means of an agent that destabilizes the supersaturation state of the sodium oxalate, or deoxalation initiator;

separation of the precipitated oxalate with the destabilizing agent in the form of an insoluble residue and of the purified sodium aluminate solution which is recycled as the leaching liquor, characterized in that the destabilizing agent, or deoxalation initiator, brought into contact with the sodium aluminate solution, is a salt other than an oxalate, a metal oxide, a metal hydroxide, or a mixture thereof, said destabilizing agent remaining insoluble and chemically inert with respect to the reaction medium, and in that after regeneration, if any, it is recycled as a deoxalation initiator at the beginning of the process.

The salt other than an oxalate most frequently used as the destabilizing agent is preferably chosen from the group of calcium aluminates such as tricalcium aluminate hexahydrate $Al_2O_3 \cdot 3CaO \cdot 6H_2O$, also called ATC6.

The metal oxide usually used as the destabilizing agent is preferably chosen from the group of iron oxides or aluminum oxides such as alpha or alpha+beta type calcined alumina, transition alumina, and the intermediates formed by mixing these aluminas.

The metal hydroxide usually used as the destabilizing agent is preferably chosen from the group of iron hydroxides or aluminum hydroxides, such as aluminum trihydroxide or alumina trihydrate $Al_2O_3 \cdot 3H_2O$, aluminum monohydroxide or alumina monohydrate $Al_2O_3 \cdot H_2O$.

Surprisingly, it in fact proved that the destabilizing agents according to the invention, in particular tricalcium aluminate hexahydrate, can advantageously serve as replacements, as agents destabilizing the concentration state of sodium oxalate, for sodium, barium, or calcium oxalate initiators, but also for the lime initiators recommended by the prior art. Abiding by well-defined operating conditions, particularly the temperature and soda concentration in the sodium aluminate solution, it is possible to precipitate sodium oxalate fairly selectively without entraining prohibitive quantities of organic matter.

Thus, inasfar as the aluminate solution to be purified reaches a high soda or caustic soda concentration, after decomposition and concentration if necessary (caust. $Na_2O > 180$ g/l) and, with temperatures not exceeding 60° C., the destabilizing agent and in particular tricalcium aluminate hexahydrate or ATC6 remains essentially chemically inert and insoluble in the strongly alkaline solution. As a precipitation initiator of oxalate in a supersaturated solution, the destabilizing agent thus acts essentially by a mechanical liquid-solid contact effect which, in the present case, is even stronger, because it is in the finely-divided state, namely its BET surface is high. Note that, however, above 60° C. this relatively selective precipitation initiation of sodium oxalate becomes attenuated to the benefit of humic-matter precipitation.

In the 40°–60° C. temperature range, after a sufficient time in which the initiator has been in contact with the sodium aluminate solution (at least one hour and preferably five to forty hours) to allow precipitation and enlargement of small sodium oxalate crystals, it is noted that the solid phase, essentially comprised of initiator and sodium oxalate particles, is easily separable from the liquor by the known usual methods of liquid-solid separation: filtering, decanting, or centrifuging.

Note that the critical concentration threshold after which the sodium oxalate precipitates spontaneously decreases as temperature drops and that at temperatures less than 40° C. there may be unwanted precipitation of very fine sodium oxalate particles in the circuits away from the stations intended for this purpose; moreover, these very fine particles are very difficult to filter out.

Finally, the destabilizing agent according to the invention, in particular, ATC6, has the advantage over other known destabilizing agents of being very readily recyclable because it retains its activity for numerous cycles without requiring regeneration, the latter furthermore being very simple, when excessive deposition of sodium oxalate is found by oxalic carbon testing, as well as a substantial decrease in BET surface area.

In fact, this regeneration may very easily be achieved by washing with water or an alkaline aqueous solution coming for example from the washings of aluminum trihydroxide precipitated in the decomposition step of the Bayer cycle or from the decanted red muds. The optimum conditions for regeneration of the initiator are a function of the quantity of organic matter entrained with the sodium oxalate precipitated on this initiator. To limit the extent of this entrainment, the sodium aluminate solution should be destabilized after its caustic soda concentration has been adjusted, preferably to between 190 and 250 g $Na_2O$/liter. The initiator, at this point charged almost solely with crystallized sodium oxalate, is generally washed by stirring or "splashing" with the washings from other steps in the Bayer process as indicated above. To limit the consumption of water and energy while minimizing losses of soda by deoxalation, measured by the weight ratio between oxalic carbon and total $Na_2O$, some of the washings from the initiator can be recycled. Of course, at all times the oxalate must be in the subsaturated state at the washing temperature. The most suitable temperature range for the washing water is preferably between 40° C. and 95° C. if the initiator is to be washed almost exhaustively, namely completely reactivated by dissolving almost all the sodium oxalate precipitated.

Below 40° C., the solubility of the sodium oxalate declines, requiring a significant increase in the volumes of washing water and, above 95° C., there is a risk that the initiator will start to dissolve and this be wasted if it is ATC6-based. In this regard, for the entire facility, the initiator waste as a result of leakage, particularly in the filtrates, is approximately 3 to 4 wt. % of the total quantity used at the beginning of each deoxalation operation. This is made up by an equivalent quantity of virgin initiator, preferably with each recycling, so that the amount of initiator is kept constant. This total quantity of initiator, generally between 5 and 100 g per liter of sodium aluminate solution to be purified, and preferably between 20 and 40 g/liter in the case of ATC6, allows the sodium oxalate precipitation kinetics, and hence the time at which the initiator remains in solution, to be adjusted within a range above one hour and preferably between 5 and 40 hours.

The initiators used as destabilizing agents according to the invention are totally or partially regenerable by washing. Of the metal oxides and hydroxides, the alpha and/or beta calcined aluminas, and the transition aluminas aluminum monohydroxide and trihydroxide are initiators that are easily regenerable by washing. Of the salts, the same applies to calcium aluminates, particularly ATC6.

One attractive possibility is to make use of a by-product of aluminum trihydroxide production by the Bayer process, which consists of using as initiator the insoluble filtration cake, before decomposition, of the supersaturated sodium aluminate solution after decanting. This insoluble cake is composed of non-decanted fine red mud particles (iron hydroxides, silica, insoluble silico-aluminates, etc.) and a lime-based filtration adjuvant (quicklime or calcium carbonate) which, in contact with the supersaturated sodium aluminate solution, upon filtration, becomes gradually converted into ATC6 such that a synthetic mixture of various destabilizing agents is created in which ATC6 is preponderant.

Most of these initiators, principally polluted with precipitated sodium oxalate, can also be easily regenerated by calcination at over 300° C. and preferably between 400 and 600° C. to break down the sodium oxalate rapidly (1 to 3 hours). Thus, the alpha and/or beta aluminas, like most of the transition aluminas stable at 600° C., are regenerated as such, while the aluminum hydroxides, after several calcination cycles, become gradually converted into transition alumina. After calcination a grinding of the initiator, which very often may be limited to a mere deagglomeration, is essential for restoring sufficient fineness. On the other hand, it is not recommended that initiators based on hydrated salts, such as calcium aluminates, and most particularly ATC6, be regenerated by calcination: ATC6 not only loses its water of crystallization at a low temperature, but dissociates partially starting at 280° C. with lime being released, according to the following reaction:

$$3CaO.Al_2O_3 6H_2O \rightarrow 12CaO.7Al_2O_3 H_2O + 9Ca(OH)_2 + 32H_2O$$

The mixture thus obtained can obviously not be recycled as an initiator, as it is no longer chemically inert to the sodium aluminate liquor to be treated.

With a view to optimizing the process implementation conditions, it should finally be noted that the increased caustic soda concentration of the liquor (concentration of free soda plus combined soda in $Al_2O_3$ $Na_2$ expressed in $Na_2O$ g/l) tends to reduce the critical sodium oxalate concentration threshold. This threshold is principally influenced by the presence of organic materials in the liquor which have undergone little breakdown. The higher the organic matter (particularly humic matter) content of the liquor, the higher this threshold, so that it can easily be concluded that the process according to the invention will be more effective if this threshold is higher, meaning that the quantity of oxalate able to precipitate is large for a given liquor volume. This is why one of the best applications of the invention is the treatment of tropical bauxites with trihydrate. These bauxites, based on hydragillite[1] and rich in organic matter become vulnerable to alkaline attack at a temperature of generally $\leq 50°$ C. such that the leaching liquor becomes gradually enriched with sodium oxalate as the organic matter breaks down over time. Because of this, the level of soluble sodium oxalate can reach 0.4 to 0.7 wt. % of oxalic carbon as a percentage of caustic soda (free soda plus soda in $AlO_2Na$ state) before being reduced after precipitation according to the process of the invention to percentages of 0.15 to 0.35%. It will also be noted that, in the case of b auxite of the monohydrate type with a low organic matter content which moreover is attacked at a high temperature ($\leq 200°$ C.), the critical concentration threshold does not exceed 0.20 to 0.25 wt. % oxalic carbon as a percentage of caustic soda due to the presence of a very small quantity of stabilizing organic matter in the liquor. This threshold can be artificially raised to 0.4 or 0.5% by adding to the liquor, at any point in the Bayer cycle, a synthetic, anionic polyelectrolyte such as polyacrylamide or polyacrylic acid, according to the teaching of Patent EP 0173630 (U.S. Pat. No. 4,597,952) in the name of the applicant. The sodium oxalate precipitation retarding effect of this synthetic substance, which is similar to that of the organic or slightly degraded organic matter naturally present in the Bayer liquor, allows the process of the present invention to be applied to all the bauxites with the same effectiveness as for the tropical trihydrate bauxites.

[1] Presumably a misspelling for "hydrargillite"—Translator.

IMPLEMENTATION OF INVENTION

The reduction to practice of the invention will be better understood from the description based on:

the general process flowchart (FIG. 1) which, after regeneration by washing, comprises recycling of an ATC6-based initiator used as the destabilizing agent;

or, the same general flowchart (FIG. 2) which, after regeneration by calcination, comprises recycling of an initiator based on alpha alumina used as the destabilizing agent;

but also the simplified general flowchart (FIG. 3) comprising recycling of an ATC6-based initiator without prior regeneration.

Figure 1:
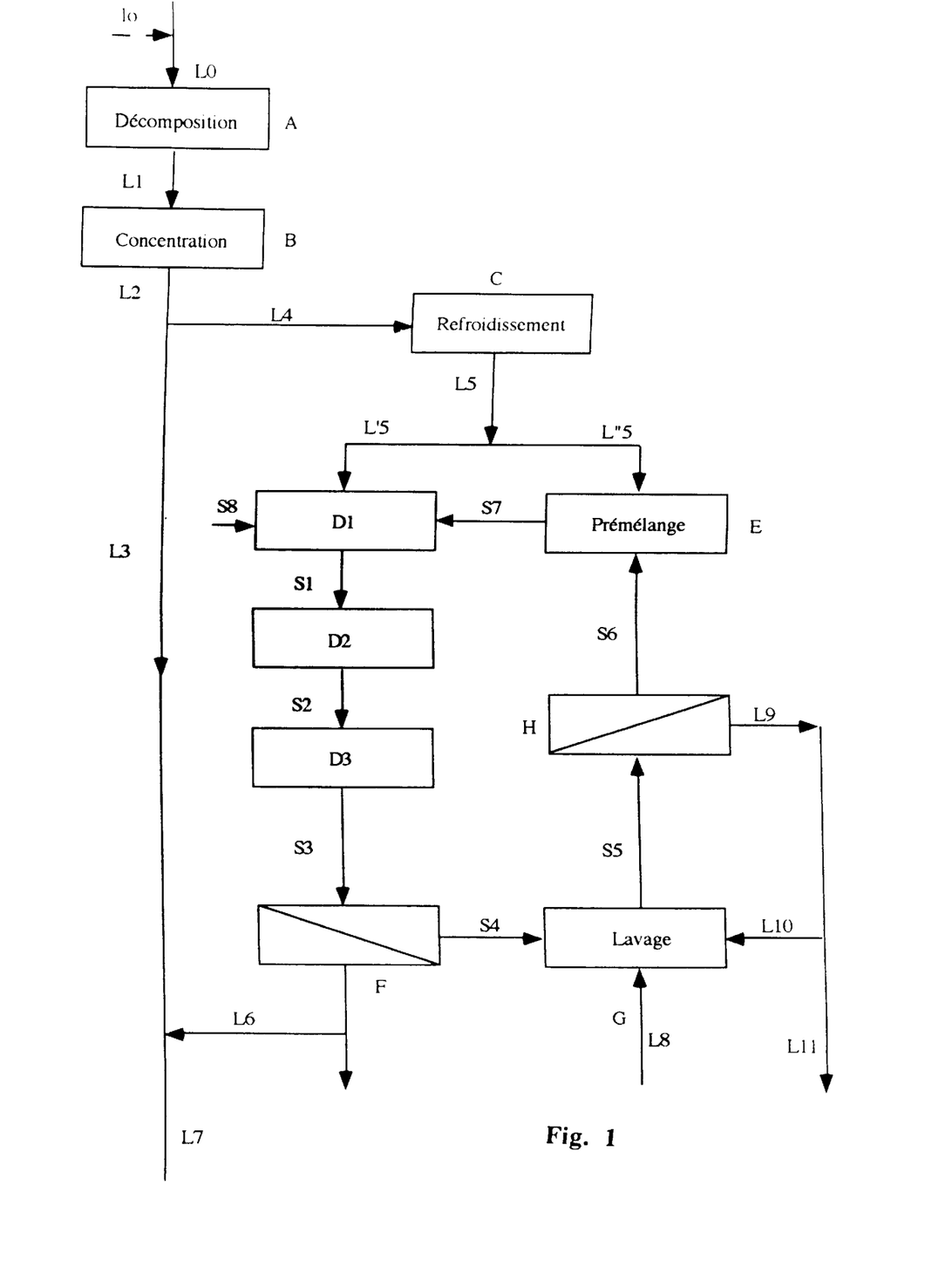

According to FIG. 1, one option is to add to the supersaturated sodium aluminate solution L0 or Bayer liquor, before decomposition step A, an anionic polyelectrolyte I0, for example, FLOERGER (R) type AN 934 SH in the proportion of approximately 20 mg per liter of solution in order, if necessary, to raise the critical sodium oxalate concentration threshold to above 0.40% measured relative to the ratio between oxalic carbon and caustic soda, namely ox C g/l/caustic $Na_2O$ g/l.

After decomposition A, conducted in known fashion in the presence of an aluminum trihydroxide initiator, the resulting decomposed liquor L1, whose ratio Rp of the concentrations $Al_2O_3$ sol g/l/caustic $Na_2O$ g/l is preferably between 0.55 and 0.65 and whose caustic soda concentration is preferably between 140 and 160 g $Na_2O$/liter, is concentrated in step B and the resulting liquor L2, whose caustic soda proportion is at least 180 g $Na_2O$/liter, and preferably between 190 and 250 g $Na_2O$/liter. It is then separated into two fractions, a principal fraction L3 representing over 90 vol. % L2 which, after mixing L7 with the already deoxalated liquor L6, is recycled to the top of the process at the station (not shown) at which the ore is attacked, and a minor fraction L4 representing less than 10% and preferably 4 to 8% of liquor volume L2, intended to undergo deoxalation according to the process of the invention. The size of the L4 fraction is of course a function of the quantity of sodium oxalate to be eliminated in each cycle to prevent gradual enrichment of the Bayer liquor with sodium oxalate and hence any risk of unwanted precipitation of this oxalate onto the aluminum trihydroxide grains when decomposition occurs.

The resulting liquor L4 is cooled to between 40° and 60° C. such that, under the combined effect of the very high soda concentration and the drop in temperature, cooled liquor L5, being close to its critical sodium oxalate concentration threshold, can then be easily destabilized. A principal fraction L'5 representing over 90% of volume L5, is sent directly to a first agitated reactor D1 to be contacted with a suspension S7 formed by the mixing E of washed ATC6-based initiator S6 with the minor fraction L"5 (less than 10%) of the volume L5 of cooled concentrated liquor. Suspension S1 thus formed is transferred to a second reactor with mixer D2 to form suspension S2, in its turn transferred to a third agitated reactor D3. The total time for which the ATC6-based initiator and the liquor are in contact, in this case between the three reactors cascade-fashion, is a function in particular of the quantity of initiator. For initiator concentrations of between 20 and 40 grams ATC6 per liter, the total residence time is generally between 5 and 40 hours.

The addition of ATC6-based initiator to offset the losses of approximately 3 to 4% of the total weight of initiator with each cycle takes place directly in one of the reactors, preferably first reactor D1 in the form of ATC6 prepared independently or in the form of quicklime which converts gradually into ATC6 in situ.

From suspension S3 coming from reactor D3, deoxalated liquor L6 is separated by filtration F under pressure or by centrifugation from the insoluble residue S4 formed by the sodium oxalate precipitated with the initiator. Note that a small quantity of organic matter can be entrained when this precipitation occurs. Liquor L6 mixed with L7 is recycled to the Bayer process attack station, while insoluble residue S4 is subjected to washing G, preferably by "splashing" action, in a washing water. This washing water of pH≧6 can be created only by pure water L8 coming from outside, or alkaline washing water recycled from one of the steps in the Bayer cycle (washing of precipitated aluminum trihydrate, backwashing of red muds) which can contain up to 30 g $Na_2O$ per liter. Generally, the washing by splashing shown in FIG. 1 is carried out by mixing L8 of these waters added from outside with a small fraction L10 of washing water charged with oxalate which is recycled (this configuration, provided a subsaturated sodium oxalate state in mixture L8+L10 is maintained at all times, allows water and heat consumption to be limited). The choice of an appropriate temperature range for the washing waters is also important. The average temperature with splash washing must not be less than 40° C. to ensure sufficiently complete and rapid dissolution of the sodium oxalate and organic matter already in partial decomposition. This same average temperature must be no higher than 95° C. to prevent any risk of ATC6 beginning to redissolve, but above all to optimize the recycling heat balance resulting from mixing of a hot recycled initiator with a cooled liquor. At the end of washing G, the initiator in the resulting suspension S5 is separated from washing water L9, preferably by filtration H. The initiator thus washed S6 is mixed at premixing station E with the aliquot L"5 of cooled concentrated liquor L5 to form suspension S7 recycled as the destabilizing agent, while a small fraction L10 of washing water L9 charged with sodium oxalate is reutilized mixed with L8 as washing water, but the major part L11 constituting the oxalate discharge line is eliminated.

The addition of ATC6-based initiator necessary for the initial initiator feed or merely for making up losses on each cycle is effected from powdered ATC6 prepared in an associated manufacturing line by combining quicklime with an aliquot of sodium aluminate solution proceeding from decomposition whose ratio Rp of the concentrations $Al_2O_3$ sol/caustic $Na_2O$ is less than 1.3 and preferably between 0.55 and 0.65 and the caustic soda concentration is preferably between 140 and 180 g $Na_2O$/liter.

To favor the reaction by which lime combines with aluminate according to:

$$Al_2O_3, Na_2O + 3CaO + 7H_2O \rightarrow Al_2O_3, 3CaO, 6H_2O + 2NaOH$$

the quantity of CaO is set at between ⅓ and ½ of the stoichiometric quantity. The suspension thus formed is agitated for 24 to 48 hours. Since the reaction is exothermic and the decomposed liquor reaches a temperature of 50 to 60° C., the suspension requires practically no heat for it to reach the reaction temperature of preferably 90° to 100° C. After 24 hours, the reaction has practically stabilized, since almost all of the lime has combined. After filtering, washing and drying, between 70° and 90° C., the insoluble ATC6-based residue has the following weight percent composition:

| | |
|---|---|
| $Al_2O_3$, 3CaO, $6H_2O$ | 98 to 99% |
| $Ca(OH)_2$ | 0.4 to 1.5% |
| $CaCO_3$ | 0.4 to 1.5% |
| $Na_2O$ | 0.05 to 0.3% |
| other impurities | 0.1 to 0.3% |

The median diameter D50 of the ATC6 is generally between 2 and 15 microns and its BET surface area is between 1 and 10 $m^2/g$.

In fact, the destabilizing initiator can be added more simply by accomplishing this reaction in situ, namely by having quicklime CaO that is intended to undergo the deoxalation treatment according to the invention, directly contact the fraction of the decomposed sodium aluminate solution before or after concentration. If the entire batch of lime introduced has not fully converted to ATC6 after the destabilizing treatment, the mixed $Ca(OH)_2$/ATC6 initiator, which has been fully recycled after any regeneration to eliminate precipitated sodium oxalate, gradually converts into ATC6 in successive cycles.

Figure 2:
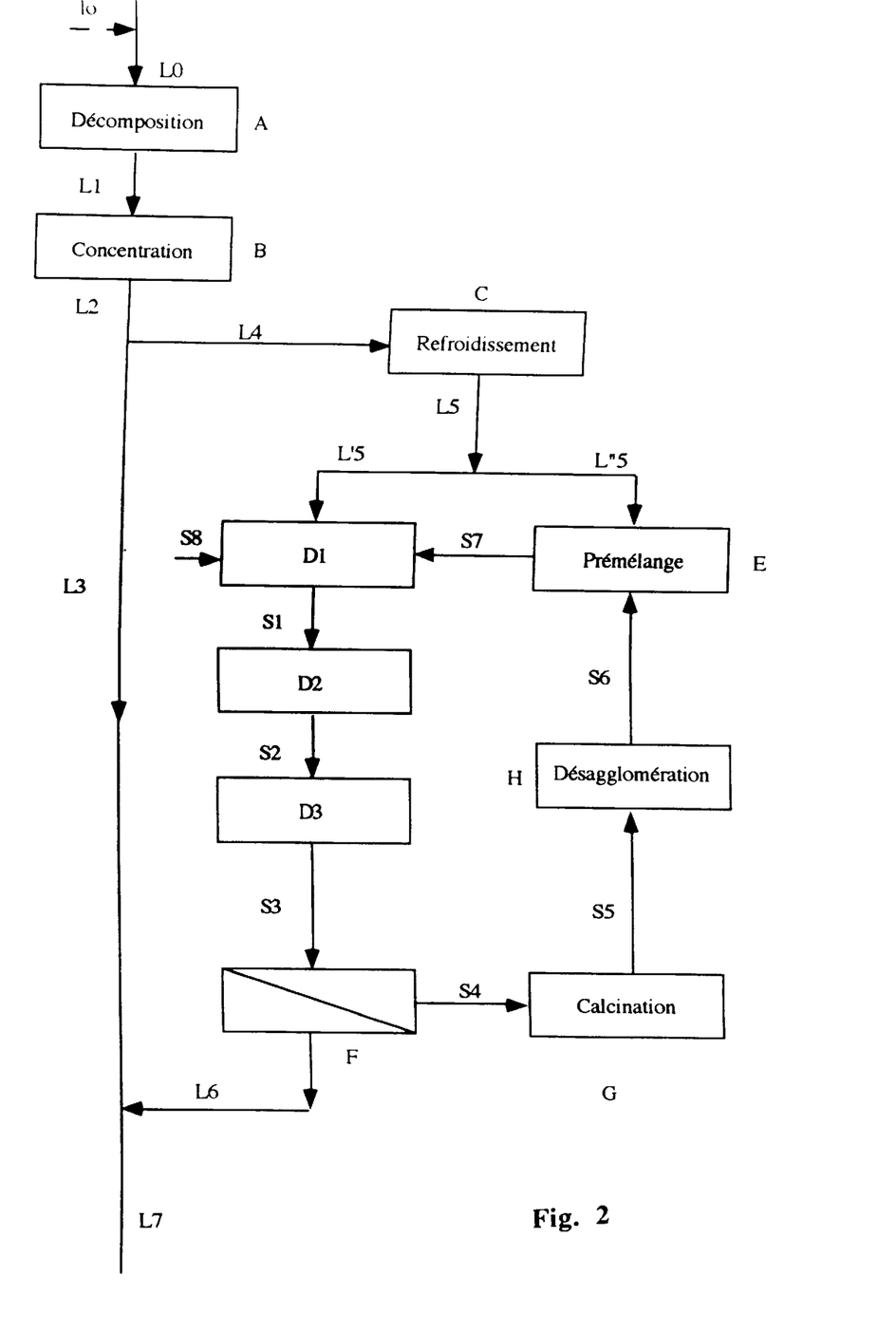

The variant of the process according to the general process flowchart of FIG. 2 recycles an alpha alumina-based initiator after regeneration by calcination. Thus, once cooled liquor L5 has been obtained under the same conditions as before, a principal fraction L'5 representing over 90% of the volume of liquor 5 is placed in contact, in a first agitated reactor D1 with a suspension S7 formed by the mixture E of the deagglomerated alpha alumina initiator S6 after calcination, with the minor fraction L"5 (less than 10 vol. % of L5) of the cooled, concentrated liquor. The suspension S1 thus formed is transferred to a second agitated reactor D2 to form suspension S2, which in its turn is transferred to a third agitated reactor D3. The total time for which the alpha-alumina-based initiator and the liquor are in contact, which in this case occurs in three reactors in a cascade, is a function in particular of the quantity of initiator. For initiator concentrations between 5 and 100 g alpha alumina per liter, the total residence time is between 5 and 40 hours. Then, from suspension S3 coming from reactor D3, deoxalated liquor L6 is separated by filtration F under pressure or centrifugation of the insoluble residue S4 formed by the sodium oxalate precipitated with the initiator. The liquor L6 mixed with L7 is recycled to the Bayer process attack station, while the dried insoluble residue S4, is calcined between 400° C. and 600° C. for approximately 1 to 3 hours, namely until its weight loss due to moisture evaporation and sodium oxalate decomposition has settled. The alpha-alumina-based initiator calcinate S5, thus regenerated, is deagglomerated by grinding to break down the large lumps that form when the alumina grains stick together upon calcination. The initiator S6 deagglomerated in this way is prediluted with the aliquot L"5 of cooled, concentrated liquor to form recycled suspension S7 at the top of the process as the destabilizing agent.

According to this variant of the general flow pattern where a regenerated initiator is recycled after calcination, the loss of initiator per cycle is also 3 to 4 wt. % of the initial quantity of initiator added and compensation preferably takes place in top reactor D1 by adding an equivalent weight of initiator which, in the present case, is an alpha-type calcined alumina (sold by Aluminium Pechiney under number P172) with a BET surface area of 4 $m^2/g$, the median lump diameter (D50 laser) is 75 $\mu$m for an average crystallite size of 0.5 $\mu$m.

More generally, calcined aluminas with a BET surface area of between 1 and 50 $m^2/g$ are suitable if they are sufficiently deagglomerated to D50<100 $\mu$m.

Figure 3:
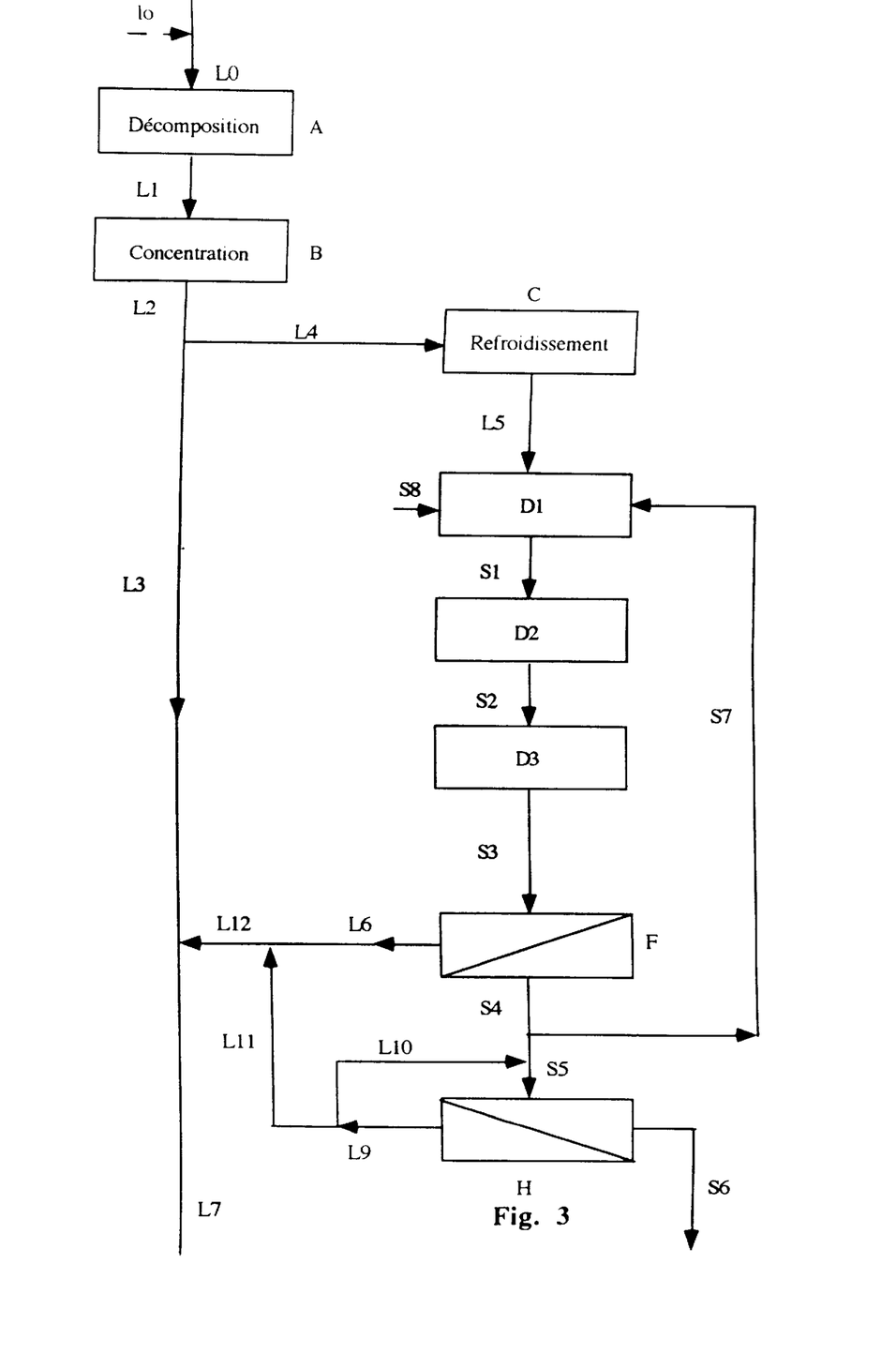

The simplified version of the process according to FIG. 3, which does not include initiator regeneration before recycling, requires periodic replacement of a fraction of initiator passivated by the precipitated sodium oxalate and the organic matter by further addition of initiator. For implementation of this simplified version, it is preferable to use ATC6, considered the most efficient destabilizing agent, as the initiator. This simplified version is preferably applied to deoxalation treatment of bauxites with a low organic matter content and thus containing fewer breakdown products, particularly sodium oxalate. The volumes of liquor treated are generally greater than in the basic process—10 to 20% of the volume of decomposed liquor—and possibly concentrated in circulation instead of 4 to 8% as before, in which case it is preferable to separate the insoluble residue formed by the sodium oxalate precipitated with the initiator from the deoxalated solution by decanting, especially as the unwashed initiator is always difficult to filter.

In FIG. 3, liquor L2, after concentration B of the decomposed liquor L1, which itself has come from decomposition of the supersaturated Bayer liquor L0, possibly plus an electrolyte IO, is separated into two fractions:

a principal fraction L3 representing at least 80 vol. % of L2 which, after mixing L7 with liquor L12 that has already been deoxalated, is recycled to the top of the process at the ore attack station (not shown)

a minor fraction L4, not exceeding 20% and preferably between 10 and 20% of the volume of L2, which is to undergo deoxalation according to the simplified process of the invention.

Fraction L2 is concentrated by evaporation B to produce a liquor L5 after cooling C of liquor L4 between 400 and 60° C. with a caustic soda concentration of at least 180 g $Na_2O$/liter and preferably between 190 and 250 g $Na_2O$/liter. This liquor L5 is placed in contact, in a first agitated reactor D1, with a thickened suspension S7 of unwashed initiator based on recycled ATC6, as well as with the new initiator S8 designed to make up for initiator losses, particularly by draining, which are approximately 10% of the total weight of dry initiator. Once again, the initiator is added directly in the form of ATC6 prepared independently or in the form of quicklime which is gradually converted into ATC6 in contact with the free soda. Suspension S1 coming from reactor D1 is treated as above in two other reactors D2 and D3 in cascade to produce a suspension S3 of initiator charged with oxalate precipitated in the deoxalated liquor. This suspension S3 is then subjected to decanting F to separate the deoxalated supernatant liquor L6 from the insoluble residue formed by the polluted initiator S4. A substantial fraction, representing approximately 90 wt. %, of insoluble residue S4 is directly recycled in the form of a very thick suspension S7 as the initiator in top reactor D1 while the remaining fraction S5 of approximately 10% is filtered H to separate the insoluble residue of polluted initiator S6 which is eliminated, from deoxalated liquor L9 of which the major portion L11 (at least 80 vol. %) rejoins L6 to form the return L12 of deoxalated liquor to the decomposed, concentrated liquor circuit L3 and thus to reconstitute the concentrated liquor purified of some of the oxalate or leaching liquor 17. The minor fraction L10 representing 10–20 vol. % of L9 is recycled to filtration as a dilution liquor of the decanting residue S4.

APPLICATION EXAMPLES

EXAMPLES 1

According to the basic process of the invention as shown schematically in FIG. 1, 23 m³ of liquor L4 is removed from the decomposed liquor circuit L2 whose total volume is approximately 500 m³ and which comes essentially from alkaline attack at 105° C. of a tropical trihydrate bauxite, said liquor L4 having the following composition:

| | |
|---|---|
| Caustic Na₂O g/l | 190 |
| Rp | 0.60 |
| Ratio of oxalic C to caust. Na₂O | 0.50% |

After cooling to 50° C., a fraction L'5 representing 90 vol. % of the cooled liquor L5 is mixed in agitated reactor D1 with 690 kg of recycled ATC6, washed and prediluted in 10 vol. % of the remaining liquor L"5. To make up for the loss of approximately 4% ATC6 in the previous cycle, 27 kg of new ATC6 is added in the powder form. This gives a homogenous suspension of initiator of 690+27=717 kg of dry matter in approximately 23 m³ of liquor, namely a suspension with 31 g initiator per liter, after transfer successively to two reactors D2 and D3 in series, corresponding to a total residence time of 20 hours at 50° C. The resulting suspension S3 representing a volume of approximately 24 m³ is then filtered in less than one hour through a 30 m² filter.

The filtrate L6 of deoxalated liquor with a volume of approximately 23 m³ is mixed with the fraction of non-deoxalated liquor L3 to form leaching liquor L7. In the 23 m³ of liquor L6, it is found that the amount of oxalic carbon in g/l in the caustic Na₂O in g/l (which was 0.50% in liquor L5) has dropped to 0.25% with identical volume, which corresponds to elimination of 190 [0.50–0.251]×2310³/100= 10930 g of oxalic carbon, equivalent to 61 kg of sodium oxalate.

In parallel, after drying the insoluble wet cake S4 of initiator charged with crystallized sodium oxalate containing less than 3% free soda expressed as Na₂O is subjected to washing by splashing action in approximately 5 m³ of washing water at a temperature of 60° C. 50% of the washing water comes from recovery of a fraction L8 of washing water from backwashing the red muds and 50% from recycling L9 of this washing water L10 after separation by filtration H of suspension S5 coming from washing (the other fraction L11 is the sodium oxalate discharge). Under these conditions, the sodium oxalate content expressed in oxalic carbon in the 5 m³ of washing water is less than 10 g per liter and its free soda content does not exceed 20 to 30 g Na₂O/liter. Since this washing water is undersaturated, the sodium oxalate crystallized on the initiator and the more or less degraded organic matter entrained with the oxalate are completely dissolved. Note that after ten or so cycles with gradual enrichment of the washing water L10 thus recycled with sodium oxalate, the sodium oxalate must be discarded totally by discharging all the washing water.

This being the case, one can ensure complete regeneration of the ATC6-based initiator which retains its activity over time. In fact, after 10 similar cycles, this same initiator (after weight-for-weight compensation of losses at each cycle) achieves almost the same deoxalation efficiency in the same Bayer liquor as that of the first cycle described above, since the oxalic carbon as a percentage of caustic NaO₂, initially 0.50% in the liquor before destabilization, has dropped to 0.27% (0.25% in the first cycle).

EXAMPLE 2

This example reproduces the conditions of Example 1 from which it is distinguished merely by the fact that regeneration before recycling of the polluted calcined alumina initiator is accomplished by calcination. Thus, after drying, the wet, insoluble cake S4 formed by the initiator charged with precipitated sodium oxalate and containing less than 2% free soda expressed as Na₂O is air-calcined for two hours at 500° C. until the total weight loss has stabilized. After deagglomeration, for example by spraying in an air jet, a quantity of 694 kg initiator based on regenerated alumina is recovered and this reproduces the physical and chemical characteristics of the 717 kg of initial virgin initiator, namely:

Calcined alumina—mixture of alpha, chi, and delta phases

BET area=30 m²/g and D50=70 μm (Aluminium Pechiney marketing reference AR.45)

This initiator, regenerated in this manner, is premixed with L"5 as before to form a suspension S7 with a very high concentration of dry matter which is then diluted in D1 with the other aliquot L'5 with addition of 23 kg of virgin initiator based on aluminum to offset the corresponding initiator loss of approximately 3 wt. % per cycle.

Note that after the 10th cycle, the deoxalation efficiency of the initiator was practically unchanged, since the initial oxalic carbon percentage of the liquor dropped from 0.50% to 0.28% instead of 0.26% in the first cycle.

EXAMPLE 3

This example reproduces the conditions of Example 1 from which it is distinguished merely by the fact that the quantity of initial initiator, as well as the successive initiator additions to make up for losses during each cycle, are comprised of quicklime instead of ATC6. This lime, in contact with liquor L'5 in reactor D1 acts like ATC6, behaving as a heterogeneous initiator, and acts as a destabilizing agent of the oxalate-charged liquor. During precipitation of the sodium oxalate under the experimental conditions of the invention, the lime combines with the alumina in the liquor solution and is gradually converted into ATC6 such that after 2 or 3 cycles, the initiator is almost totally comprised of ATC6 precipitated in situ.

For initiator concentrations of between 9 and 18 g/liter corresponding, after conversion in situ to ATC6, to approximately 20 and 40 g of ATC6/liter, the contact times are also between 5 and 40 hours to obtain a purification efficiency equivalent to that obtained with an exogenous ATC6 initiator; that is, after regeneration of the initiator by washing, it has constant activity and hence equivalent efficiency measured by the decrease in oxalic carbon as a percentage of caustic soda expressed in Na₂O which drops from 0.50% to approximately 0.25% even after ten or so cycles.

EXAMPLE 4

According to the simplified process of the invention, shown schematically in FIG. 3, approximately 72 m³ of liquor L4 in the decomposed liquor circuit L2 with a total volume of approximately 500 m³ coming from attack at 250° C. of a monohydrate bauxite of Mediterranean origin, hence containing little organic matter, is used. Note that since the critical sodium oxalate concentration threshold of the original liquor L0 before decomposition A and concentration B, expressed by the ratio between oxalic C g/l and Na₂O g/l, was rather low, 0.19%, it was raised to 0.32% by addition, at the rate of 20 mg/liter of anionic polyelectrolyte (FLOERGER AN 934 SH). After decomposition and concentration by evaporation, the resulting liquor L2, and hence the fraction L4 of 72 m³ have the following composition:

| | |
|---|---|
| caustic Na₂O g/l | 200 |
| Rp | 0.615 |
| oxalic C in Na₂O | 0.30% |

After cooling to 60° C., the 72 m³ of liquor L5 is placed in contact in a series of 3 reactors in cascade, D1, D2, D3, with the thickened suspension S7 of unwashed recycled initiator representing approximately 50 wt. % of the initial charge of virgin ATC6 initiator, namely approximately 1080 kg dry matter and with 1080 kg of virgin ATC6-based initiator intended to make up exactly for the loss of polluted initiator.

The resulting suspension S3 constituted by 2×1080=2160 kg of ATC6-based initiator in 72 m³ of liquor L5 corresponding to a concentration of 30 g of initiator per liter, after a total residence time of approximately 30 hours in reactors in cascade, is decanted F for approximately 20 hours to separate the deoxalated supernatant liquor L6 from the thick residue S4 of polluted initiator. Suspension S7, thus representing 50 wt. % of the initial charge of dry initiator, is recycled as the destabilizing agent to the top of the process, while the other half S5 is filtered and dried to separate the polluted initiator remainder which is discharged from the deoxalated liquor L9. The latter, after mixing with L6, constitutes the deoxalated liquor return L12 to the decomposed liquor circuit. Deoxalated liquor return L12, whose volume is approximately 70 m, has an oxalic carbon content which is 0.2% of the Na₂O, corresponding to elimination of approximately 14 kg of oxalic carbon, equivalent to 78.1 kg of sodium oxalate, half of which is eliminated at the discharge end of each cycle.

Thanks to partial (50%) replacement of the polluted initiator by new initiator, it is possible to limit consumption of ATC-based initiator without significantly reducing the efficiency of the initiator since, after ten deoxalation cycles, an oxalic carbon content as a percentage of caustic Na₂O of 0.23% s till is obtained.

USEFULNESS OF PROCESS

The process according to the invention, particularly in its basic version which involves full recycling of the initiator after regeneration, efficiently and selectively eliminates sodium oxalate that could precipitate in sodium aluminate solutions in the Bayer cycle with practically no consumption of initiator such as initiator based on tricalcium aluminate hexahydrate, namely lime and alumina.

I claim:

1. A process for purifying sodium aluminate solutions resulting from alkaline attack of bauxites, comprising:

first adding of a destabilizing agent to a first sodium aluminate solution supersaturated with sodium oxalate, to form a first precipitate comprising said destabilizing agent and sodium oxalate; and reyling said destabilizing agent from said first precipitate, by a second adding of said destabilizing agent to a second sodium aluminate solution supersaturated with sodium oxalate, to form a second precipitate comprising said destabilizing agent and sodium oxalate;

wherein said destabilizing agent comprises at least one member selected from the group consisting of a metal hydroxide, a metal oxide and a salt other than an oxalate.

2. The process of claim 1, wherein said destabilizing agent comprises a calcium aluminate.

3. The process of claim 2, wherein said calcium aluminate is tricalcium aluminate hexahydrate.

4. The process of claim 1, wherein said destabilizing agent comprises at least one member selected from the group consisting of iron oxides and aluminum oxide.

5. The process of claim 4, wherein said destabilizing agent comprises at least one aluminum oxide selected from the group consisting of alpha calcined alumina, alpha+beta calcined alumina and a transition alumina.

6. The process of claim 1, wherein said destabilizing agent comprises at least one member selected from the group consisting of iron hydroxides and aluminum hydroxides.

7. The process of claim 6, wherein said destabilizing agent comprises at least one aluminum hydroxide selected from the groups consisting of aluminum trihydroxide and aluminum monohydroxide.

8. The process of claim 1, wherein said first sodium aluminate solution during said first adding, and said second sodium aluminate solution during said second adding, are at a temperature of at most 60° C., and have a caustic soda concentration greater than 180 g Na₂O/liter.

9. The process of claim 8, further comprising:

first separating of said first precipitate from said first sodium aluminate solution; and second separating of said second precipitate from said second sodium aluminate solution;

wherein said temperature is 40–50° C., and a period of time between said first adding and said first separating is at least one hour, and a period of time between said second adding and said second separating is at least one hour.

10. The process of claim 8, wherein said caustic soda concentration is 190–250 g Na₂O/liter.

11. The process of claim 1, where an amount of said destabilizing agent added during said first adding is 5–100 g/liter; and an amount of said destabilizing agent added during said second adding is 5–100 g/liter.

12. The process of claim 3, where an amount of said destabilizing agent added during said first adding is 20–40 g/liter; and an amount of said destabilizing agent added during said second adding is 20–40 g/liter.

13. The process of claim 12, further comprising the step of preparing said destabilizing agent by combining quicklime with an aliquot of a sodium aluminate solution.

14. The process of claim 12, wherein quicklime in said destabilizing agent is transformed into tricalcium aluminate hexahydrate during said process.

15. The process of claim 6, wherein said destabilizing agent comprises a filtrate prepared by filtering bauxite ore after hot-treatment with an aqueous sodium hydroxide solution.

16. The process of claim 15, wherein said filtrate comprises red mud fines and a lime-based filtration adjuvant partially converted into tricalcium aluminum hexahydrate.

17. The process of claim 1, further comprising:

attacking an aluminum monohydrate bauxite having a low organic-matter content, to form said first or said second sodium aluminate solution; and adding a synthetic anionic polyelectrolite to said first or second sodium aluminate solution to increase the critical sodium oxalate concentration threshold.

18. The process of claim 1, further comprising:
first separating of said first precipitate from said first sodium aluminate solution; and
regenerating said destabilizing agent from said first precipitate.

19. The process of claim 18, wherein said regenerating is carried out by washing said precipitate in a washing water having a pH less than or equal to 6, at a temperature of 40°–95° C.

20. The process of claim 19, wherein said washing water is pure water or an alkaline wash water containing up to 30 g $Na_2O$/liter.

21. The process of claim 20, wherein said wash water contains oxalate.

22. The process of claim 18, wherein said regenerating is carried out by a method comprising:
drying and calcining said precipitate; and
deagglomerating said precipitate by crushing.

23. The process of claim 22, wherein said calcining is carried out at a temperature of at least 300° C.

24. The process of claim 1, further comprising:
first separating of said first precipitate from said first sodium aluminate solution by decanting; and
second separating of said second precipitate from said second sodium aluminate solution by decanting.

25. The process of claim 24, wherein said second adding of said destabilizing agent is carried out by adding a suspension of said first precipitate to said second sodium aluminate solution.

26. The process of claim 24, further comprising filtering and drying a portion of said first precipitate.

27. In a Bayer processing including the steps of hot-treating bauxite ore with an aqueous sodium hydroxide solution to form a sodium aluminate solution, separating unattacked ore residue from said sodium aluminate solution, seeding said sodium aluminate solution with particles to precipitate aluminum trihydroxide, removing sodium oxalate from the sodium aluminate solution when supersaturated with sodium oxalate by adding a destabilizing agent to form a precipitate, and recycling the sodium aluminate solution after concentrating and recharging with sodium hydroxide or caustic soda, the improvement comprising:
recycling the destabilizing agent from the precipitate, and wherein said destabilizing agent comprises at least one member selected from the group consisting of a metal hydroxide, a metal oxide and a salt other than an oxalate.

* * * * *